US006535735B2

(12) United States Patent
Underbrink et al.

(10) Patent No.: US 6,535,735 B2
(45) Date of Patent: Mar. 18, 2003

(54) CRITICAL PATH ADAPTIVE POWER CONTROL

(75) Inventors: Paul A. Underbrink, Lake Forest, CA (US); Daryush Shamlou, Laguna Niguel, CA (US); Ricke W. Clark, Irvine, CA (US); Joseph H. Colles, Bonsall, CA (US); Guangming Yin, Foothill Ranch, CA (US); Patrick D. Ryan, Yorba Linda, CA (US); Kelly H. Hale, Aliso Viejo, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 09/814,921

(22) Filed: Mar. 22, 2001

(65) Prior Publication Data

US 2002/0135343 A1 Sep. 26, 2002

(51) Int. Cl.[7] .......................... H04Q 7/20; H03K 5/159
(52) U.S. Cl. ................ 455/432; 307/591; 323/283
(58) Field of Search ................ 323/283, 282, 323/280, 211, 267, 273; 307/591, 603, 303; 363/65, 71, 95, 97; 327/525; 379/61, 62; 455/69, 89, 432, 466, 550

(56) References Cited

U.S. PATENT DOCUMENTS

| | | | | |
|---|---|---|---|---|
| 4,068,159 A | * | 1/1978 | Gyugyi | 323/211 |
| 4,137,776 A | * | 2/1979 | Rudis et al. | 73/611 |
| 4,245,165 A | * | 1/1981 | Hoffman | 307/238 |
| 4,596,143 A | * | 6/1986 | Norel | 73/598 |
| 4,641,048 A | * | 2/1987 | Pollock | 307/591 |
| 4,866,314 A | * | 9/1989 | Traa | 307/603 |
| 4,980,586 A | * | 12/1990 | Sullivan et al. | 307/591 |
| 5,047,664 A | * | 9/1991 | Moyal | 307/303 |
| 5,166,959 A | * | 11/1992 | Chu et al. | 377/20 |
| 5,264,745 A | * | 11/1993 | Woo | 307/475 |
| 5,327,131 A | * | 7/1994 | Ueno et al. | 341/136 |
| 5,438,259 A | * | 8/1995 | Orihashi et al. | 324/158 |
| 5,450,030 A | * | 9/1995 | Shin et al. | 327/525 |
| 5,457,719 A | * | 10/1995 | Guo et al. | 375/373 |
| 6,121,758 A | * | 9/2000 | Bellina et al. | 323/211 |
| 6,204,650 B1 | * | 3/2001 | Shimamori et al. | 323/283 |

* cited by examiner

Primary Examiner—Rajnikant B. Patel
(74) Attorney, Agent, or Firm—Foley & Lardner (57) ABSTRACT

Modern digital integrated circuits are commonly synchronized in their workings by clock circuits. The clock frequency for a circuit must take into account the propagation delay of signals within the critical path of the circuit. If the clock time is not adequate to allow propagation of signals through the critical path, improper circuit operation may result. The propagation delay is not a constant from circuit to circuit, and even in a single circuit may change due to temperature, power supply voltage and the like. Commonly, this variation is handled by assuming a worse case propagation delay of the critical path, and then designing the clock frequency and minimum power supply voltage of the circuit so that the circuit will function under worst case conditions. However, instead of assuming a worse case propagation delay of the critical path, the propagation delay may be measured in an actual circuit path that has been constructed to be the equivalent to, or slightly worse than, the propagation delay of the critical path. By knowing the actual worst case propagation delay, the circuit may be modified to operate with lower power supply voltages, conserving power and/or to controlling the frequency of the clock, so that the clock may be operated at or near the circuit's actual, not theoretical worst case limit. Such modifications of power supply voltage and/or clock frequency may occur during circuit operation and thus, adapt the circuit to the different operating parameters of each circuit.

18 Claims, 9 Drawing Sheets

SHORTER
MAXIMUM PROPAGATION DELAY

LONGER
MAXIMUM PROPAGATION DELAY

CRITICAL PATH ADAPTIVE POWER CONTROL

BACKGROUND OF THE INVENTION

1. Field of the Invention.

The invention relates to personal communications systems that minimize power dissipation by controlling power supply voltage and clock frequency.

2. Related Art.

Portable electronic devices have become part of many aspects of personal, business and recreational activities and tasks. The popularity of various portable personal electronic communications systems, such as portable phones, portable televisions, and personal pagers, continues to increase. As the popularity of portable electronic systems has increased, so has the demand for smaller, lighter and more power efficient devices, that may operate for longer periods of time. Manufacturers continually try to increase the time a portable device may operate on a set of batteries or between battery charges. Increased time between battery charges or changes may be a significant marketing advantage.

Manufacturers have attempted to increase operational time of portable devices by producing batteries with higher energy densities, and attempting to produce circuitry that consumes less power. A benefit of reduced power consumption, in addition to an increase in operational time, is an increased reliability due to reduction of temperature increases in the devices during operation. Reduced operating temperatures are generally a consequence of reduced power dissipation.

One method to reduce power consumption is to employ digital designs. One reason for replacing analog communication systems with digital communications systems is that digital systems, generally may offer increased performance and lower overall power consumption than those of analog systems. Digital systems may dissipate less power than analog systems because digital systems typically operate using only two distinct values, ones and zeroes. These values are commonly created by semiconductors that are in a saturated state or a cut off state. In the saturation state, current flows through the device, but the voltage across the device is low. Power dissipated is equal to the voltage across the device multiplied by the current flowing through the device. The power dissipated by a device in the saturation state is equal to the amount of current flowing through the device multiplied by the saturation voltage. Because the saturation voltage across the device is low, the power is also low. In the cut off state, the voltage across a device is usually at a maximum. The current through the device, however, is low and may commonly be zero or a low leakage value. Because the cut off current is low, the power dissipated in the device is also low. Digital circuits commonly are in either a cutoff or saturation state during operation, except for the times when they are switching between states.

Generally, digital devices dissipate most of their power during the period when they are switching states. The amount of power dissipated during switching is generally dependent on the voltage of the power supply that powers the digital devices. In other words, the higher the power supply voltage, the more power will be dissipated when the device switches. Digital devices also tend to switch faster at higher power supply voltages. For the forgoing reasons, manufacturers of digital circuits, particularly in the case of portable applications, may find it advantageous to design circuits with the slowest possible clock rate at the lowest possible power supply voltage. Circuits designed for the slowest possible clock rate and the lowest possible power supply voltage are commonly submitted to a design method called worst case analysis.

In a worst case analysis, the circuit variables are assumed to be skewed so as to provide the worst conditions for circuit operation. For example, if a minimum clock rate of 1 MHz were desired, it would be assumed that the power supply was at it's lowest (i.e. worst case) operating voltage. If the worst case voltage could support a 1 MHz operation, then the reasoning is, higher operating voltages could support operating frequencies greater than 1 MHz because increasing power supply voltage generally tends to allow digital devices to switch faster. Operating voltages higher than the worst case minimum could support clock rates above 1 MHz. Worst case design assumes that all parameters are at their worst, and then calculates parameters, such as operating voltage, to determine what minimum value of operating voltage will guarantee that the circuitry will continue to function.

A problem with worst case design is that worst cases rarely, if ever occur. The worst case actually may have only a statistically infinitesimal chance of occurring, and be unrealistic in practice. Because circuitry may be designed for the case, the worst case, that may not ever occur the circuitry does not operate as efficiently as if it had been designed for normal operating conditions. In some cases, circuitry designed for normal conditions could be operated more efficiently at lower power supply voltages than a worst case design would indicate is possible. Thus, a circuit design for operation under worst case conditions may not result in the most efficient design.

SUMMARY

Dynamically adjusting the power supply voltage and clock frequency of digital circuitry, may be particularly useful in power sensitive applications. Worst case design for digital circuits may be calculated based on propagation time within the digital circuits. Propagation time is commonly defined as the time that a signal takes to travel through a digital circuit and to become stable at the output of the circuit. In general, digital circuits are synchronous circuits, typically synchronized by means of a clock. A clock functions to synchronize the changing of digital values within the circuit. A clock cycle may be commonly divided into two different portions. The first, or active, portion of the clock cycle is when signal levels are input into to a circuit. During the active portion of the clock cycle, it is common to refer to the values as being clocked into the circuit.

The second portion, or settling portion, of the clock cycle is the time period when no signals are input to the circuit. During the settling portion of the clock cycle, the signals, that were presented to the inputs of the circuit during the active portion of the clock cycle, propagate through the circuits. At the end of the settling portion of the clock cycle, all signals should have propagated through the circuit and become stable. If the settling time portion of the clock cycle is not sufficiently long, some signals may be still propagating through the circuit at the end of the settling time portion of the clock cycle and may not be stable at the end of the settling time. If signals are still changing when the active portion of the clock cycle occurs, incorrect values may be coupled into circuit inputs. If the settling time of the clock cycle is not long enough, the circuit input values that are being coupled from one circuit to another may still be changing when the active portion of the clock cycle arrives.

If conditions are such that input values are changing, when the active portion of a clock cycle occurs, the condition is commonly known as a "race." Race conditions exist when the propagation delay, i.e. the time a signal takes to travel through a circuit, exceeds the settling time portion of the clock cycle. When a race condition exists the performance of the circuit may be degraded, and the circuit may be unpredictable or may even be inoperative for its intended purpose. To avoid problems due to inadequate settling time, the settling time of the clock circuit must be long enough to avoid all circuit races. To avoid a race condition within a circuit, the circuit clock may be slowed to allow more propagation time for the signals in the circuit, or the propagation speed of the signal through the circuit may be increased. Increasing the power supply voltage of a digital circuit will generally increase the speed of signal propagation through that circuit.

The propagation speed of a circuit may be changed by adjusting the power supply voltage in order to adjust the propagation speed of signals in the circuit, for example, to avoid race conditions. By actively measuring the propagation delay of signals through a circuit, and adjusting the power supply voltages accordingly, a circuit design may be free from the constraint of selecting the power supply voltage for a theoretical worst case signal propagation time. Instead of designing the circuit for the theoretical worst case propagation time, the speed of propagation may be dynamically adjusted to match the actual propagation time within a circuit. By setting the power supply, in order to achieve the propagation speed needed, circuitry may be run at lower voltages. By running circuitry at lower voltages than a theoretical worst case, power dissipation may be lowered.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views.

DETAILED DESCRIPTION

This invention relates to power dissipation within synchronous digital circuits. In particular, the invention relates to power dissipation within wireless digital systems, such as wireless communication devices. In many wireless communications applications, it is desirable to reduce the power dissipation within the internal electronics of the portable units. One result of reduced power dissipation may be increased talk time between battery recharges.

Figure 1:
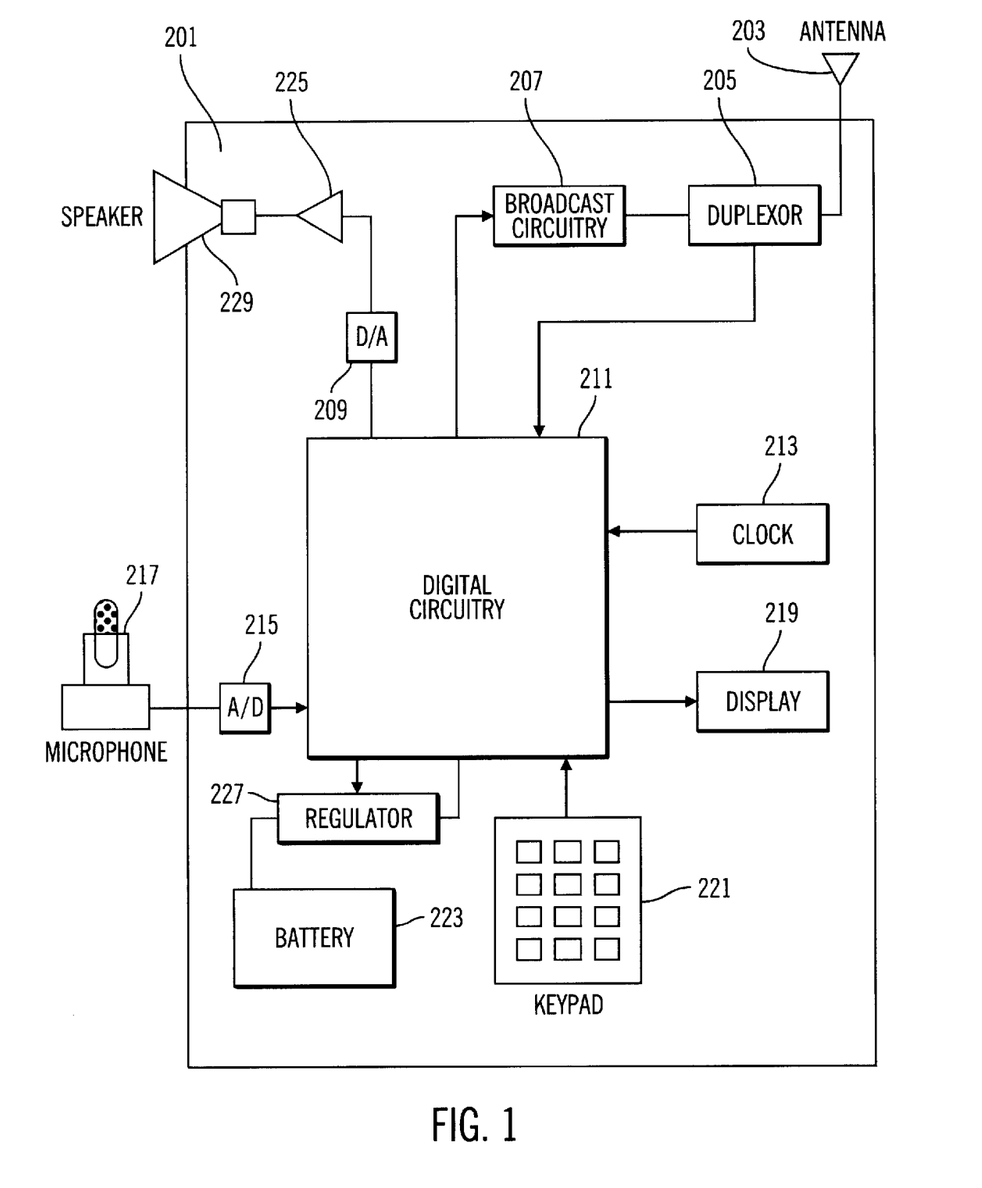
FIG. 1 is a block diagram of hardware for a cellular telephone.

FIG. 1 is a block diagram illustrating an example implementation in hardware of a cellular phone 201. The phone 201 has a microphone 217, for receiving a user's voice. The microphone 217 is coupled to an analog to digital converter 215 capable of converting voice signals to a digital signal for processing within the digital circuitry 211. The digital signal is processed and is then coupled by broadcast circuitry 207 that encodes the digitized voice signal, modulates a carrier signal based on the voice information, and amplifies the modulated signal for broadcast. The modulated signal is then coupled into a duplexor 205 that transmits the signal to the antenna 203 for broadcasting.

The antenna 203 is also used for receiving incoming signals. The incoming signals received by the antenna 203 are conveyed to the duplexor 205 and then further coupled by the duplexor 205 to the digital circuitry 211. The digital circuitry 211 demodulates and processes the received signal and presents a representation of the voice signal to a digital to analog converter 209. The digital to analog converter 209 changes the signal into an analog form that is then presented to an amplifier 225 for amplification. The amplified signal from the amplifier 225 is then coupled into a speaker 229 where sound waves are produced for perception by the user.

The cellular phone 201 also contains a keypad 221 for entering commands. The cellular phone 201 also contains a display 219 for communication of phone parameters to a user. The cellular phone 201 also contains a power source such as a battery 223 for powering the electronic components within the phone. Also provided is a clock circuit 213 that provides the clocking signals for the digital circuitry 211. The cellular phone 201 may contain a regulator 227 for regulating the power supply voltage received by the digital circuitry 211.

The voltage output of the regulator 227 that powers the digital circuitry 211 is adjusted depending upon the circuitry conditions in order to conserve battery 223 energy. By adjusting the power supply voltage of the digital circuitry 211, power consumed by digital circuitry 211 may be decreased, and the operating time between battery charges or replacements may be increased. The frequency of the clock 213 that synchronizes the digital circuitry 211 may be adjusted depending upon the circuitry conditions, in order to permit lower power supply voltages to be used without incurring races within the digital circuitry 211. A combination of regulator output voltage and clock frequency adjustments may be made to conserve power, depending on the circuitry conditions in order to conserve power.

The propagation delay of signals through digital circuitry is affected by many parameters. The material that makes up the digital devices affects the propagation speed of signals through the digital circuitry. The propagation speed of signals through the circuitry is also affected by the circuitry temperature, power supply voltage, fabrication variables, packaging variables, and other factors. It may be difficult to handle quantitatively the myriad of variables present in a system. Because of the difficulty in handling multiple variables, simplifying worst case assumptions, such as absolute maximum and minimum values, are often made. Digital circuits may be designed to meet a worst case specification, using such simplifying assumptions. A worst case specification may be overly pessimistic however, and individual circuits may often operate adequately under conditions that exceed the "worst case" specifications.

Figure 2:
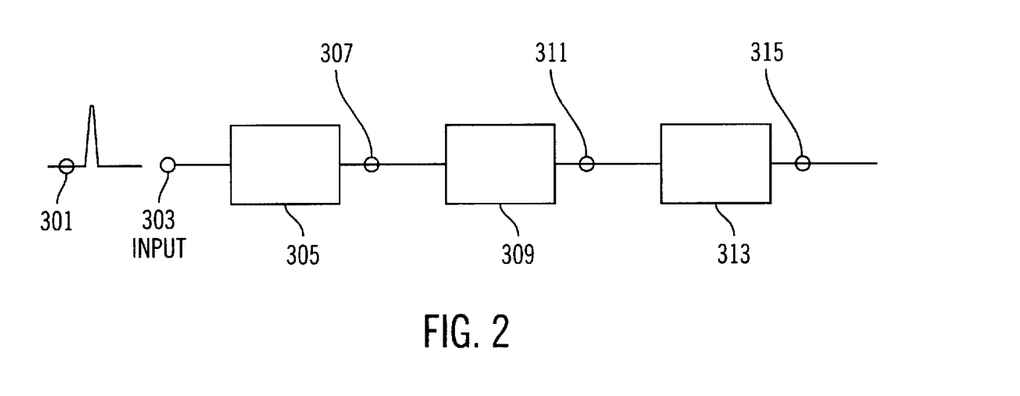
FIG. 2 is a block diagram of propagation delay digital circuit.
Figure 3:
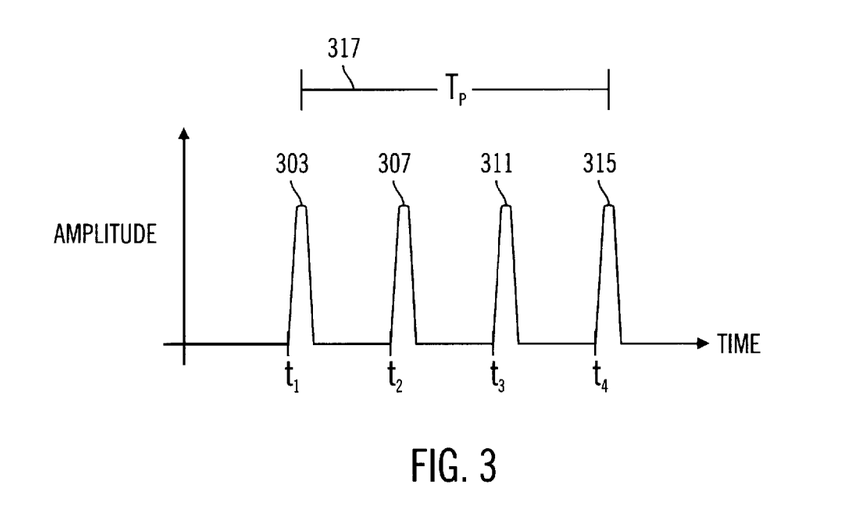
FIG. 3 is a graphical illustration of a pulse signal waveform propagation through the circuit of FIG. 2.

FIG. 2 is a block diagram illustration of propagation delay within a circuit. FIG. 2 illustrates a string of common digital buffers, 305, 309, and 313 arranged in a series connection. FIG. 3 illustrates a pulse signal waveform propagation through the circuit of FIG. 2. A pulse signal waveform 301 is coupled into the input 303 of the first buffer 305, at time $t_1$. The signal travels through the circuitry of the first buffer 305 and at time $t_2$ appears at the output 307. The signal is then transmitted to the input of the second buffer 309. The signal travels through the circuitry of the second buffer 309 and at time $t_3$ appears at the output 311 of the second buffer 309. The signal travels through the circuitry of the third buffer 313 and at time $t_3$ appears at the output 315 of the third buffer 313.

The graph 317, illustrates the timing of the appearances of the pulses at the input 303, of the first buffer 305, as well as the outputs, 307, 311, and 315, of buffers 305, 309, and 313 respectively. The propagation time, $T_P$, of the waveform 301, as it propagates through the three buffers, is the difference in time between when the time when waveform 301 appears at the first input 303 and the time the waveform subsequently appears at the third output 315. The propagation time is the waiting time that must elapse before a signal, coupled to input 303 of the buffer string, must elapse before that signal is available at the output 315 of the buffer string.

An attempt to couple the signal output 315 of the buffer string to a succeeding circuit before the propagation time, $T_P$, has elapsed will result in an incorrect value being coupled to the succeeding circuit because the waveform 301 has not had the time to propagate through the chain. The total propagation delay is dependent on how many levels of circuitry the signal must travel through before reaching an output. If there are more buffers in a chain, the propagation delay increases. Conversely, removing a buffer from a series of buffers, decreases the propagation delay of the series of buffers by an amount equal to the propagation delay of the removed buffer.

Commonly, there is more than one path that a signal may take through complex circuitry. There may be a plurality of divergent signal paths in modern complex integrated circuits. Thus, a modem complex integrated circuit may exhibit various propagation delays depending upon the signal path in the circuit.

Figure 4:
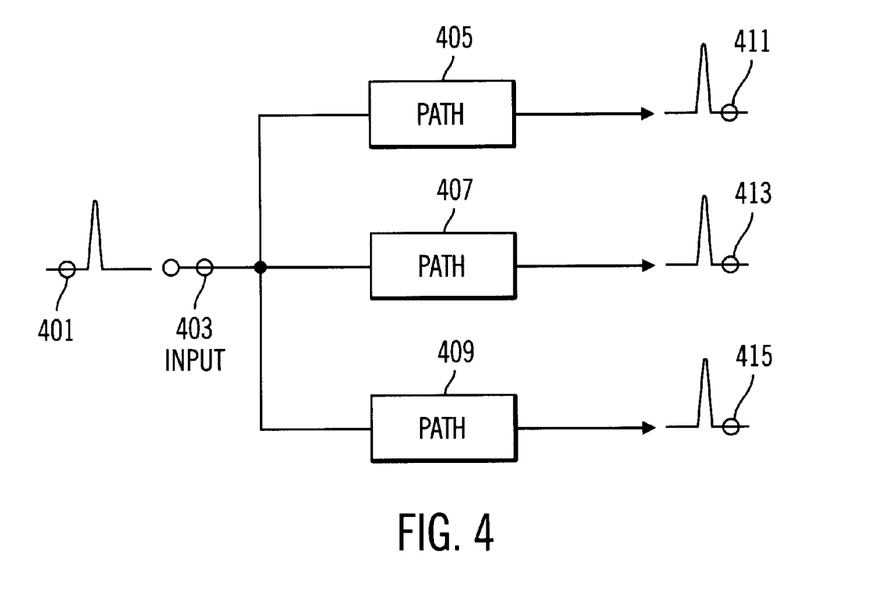
FIG. 4 is a block diagram illustrating divergent circuit paths for electronic signals.
Figure 5:
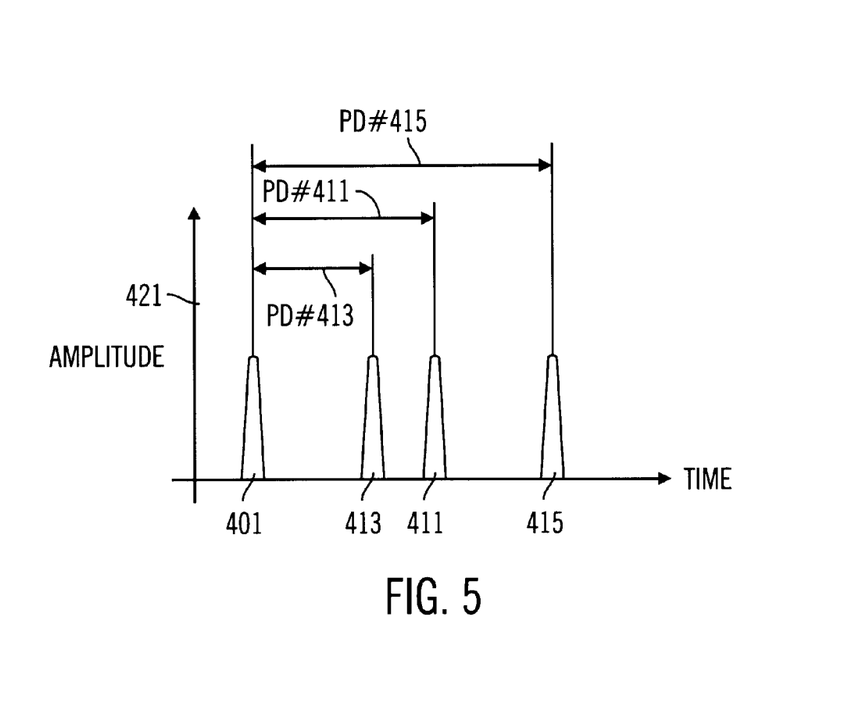
FIG. 5 is a graphical illustration of waveform propagation delays in the circuit of FIG. 4.

FIG. 4 is an illustration of divergent signal paths through circuitry. Signal 401 is transmitted as input 403. Signal 401 is then further transmitted through circuitry path 405, circuitry path 407 and circuitry path 409. The graph 421 in FIG. 5 illustrates the various propagation delays encountered in the circuitry of FIG. 4. Signal 411 has a propagation delay, PD# 411, Signal 413 has a propagation delay, PD# 413 and Signal 415 has a propagation delay, PD# 415.

Modem integrated circuits may have many such paths through which a signal may travel. Adding complexity to the analysis of propagation delay is the fact that all paths may not always be active. Generally, the longest path that a signal may take in traveling through a circuit is referred to as the "critical path." The critical path is the active circuit path containing the longest propagation delay. The critical path is so named because of the criticality of allowing enough time be allowed so that a signal may travel through the critical path. If there is enough time allowed such that a signal may safely traverse the critical path, then it safely may be assumed that enough time has been allowed to traverse all the sub-critical, i.e. shorter, paths.

Propagation delay is often measured in terms of "gate delays." A gate delay is commonly defined as the amount of time that it takes a signal to traverse a logic gate. In other words, a gate delay is the propagation delay of a single gate. In general, the propagation delay of a simple single gate in an integrated circuit is considered to be essentially constant, no matter what type the gate is. That is an AND gate is considered to have essentially the same delay as an OR gate, that is considered to have essentially the same delay as an inverter, etc. Because gate delays tend to be similar, for simple gates, the critical path is some times referred to as being an integer number of gate delays. By identifying the number of gate delays in the critical path for each input signal of an integrated circuit, the critical path for each signal input may be determined. If all of the critical paths of the circuit may be quantified in terms of gate delays, then the path having the largest number of gate delays becomes the critical path for the entire circuit. Identifying all the signal paths through a circuit may be a difficult task. With the aid of modem computer aided design tools, the task may be simplified.

By identifying the number of gate delays in a circuit's critical path, a maximum clock rate may be determined. The maximum clock rate must allow a settling time that is longer than the propagation delay in the critical path of the circuit. A difficulty may arise because the longest critical path for a particular type of integrated circuit is commonly defined as an integer number of gate delays. For each integrated circuit produced, the gate delay of that circuit is somewhat different than other "identical" integrated circuits. Furthermore, gate delays will commonly vary according to the power supply voltage of the circuit.

Figure 6:
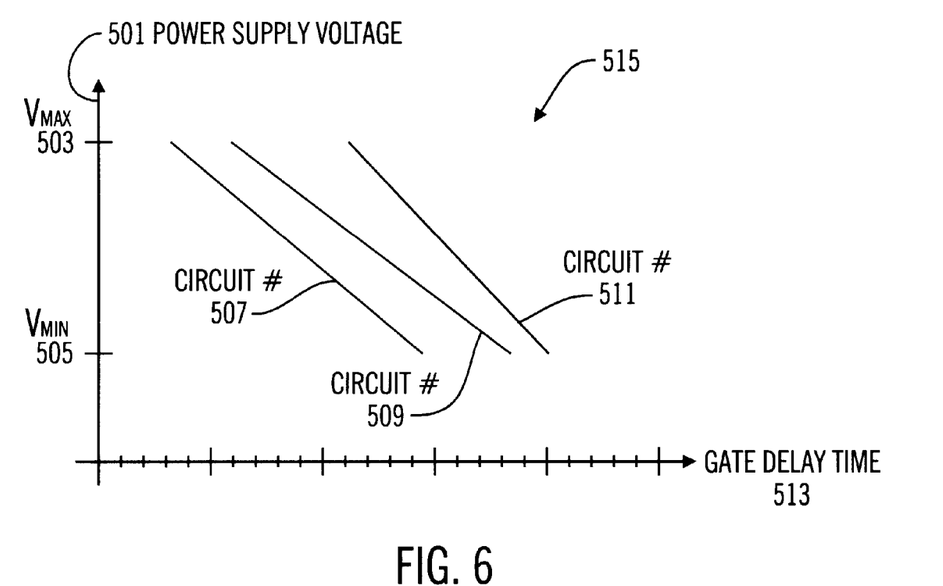
FIG. 6 is a graphical illustration of variations of gate delays in different circuits having different power supply voltages.

FIG. 6 illustrates example variations of gate delay for different circuits over differing power supply voltages. Graph 515 illustrates the gate delay verses voltage for 3 circuits 507, 509 and 511. Circuit 507 is the fastest circuit, that is the gate delay propagation time, plotted on the horizontal axis 513, is the smallest for any power supply voltage between $V_{MIN}$ 505, the minimum power supply voltage and $V_{MAX}$ 503, the maximum power supply voltage. The power supply voltage of the circuits is plotted on the vertical axis 501. Circuit 511 represents the slowest circuit. All three circuits may be the same type of integrated circuit. The difference in propagation delay may be due to such factors as temperature, the fabrication process, or a variety of other factors. It may be difficult to predict the effect of each factor because of imprecise circuit models, and because many of the factors may interact in unknown ways. It is however, easier to measure the effect of the factors than it is to predict them.

The critical path for the circuit may be duplicated on the chip, gate for gate. In such a case, the critical path is emulated by a second, identical path that is duplicated on the chip. By duplicating the critical circuit path on the chip and perhaps adding a gate delay as a safety margin, a maximum propagation delay circuit may be created. Because the maximum propagation delay circuit is created on the same integrated circuit as the critical propagation delay, they share the same process and are exposed to the same temperature, power supply voltage, etc., as the actual critical circuit path. Because the emulated propagation delay circuit contains similar gates and similar gate delays, the actual critical path of the circuit and is exposed to the same conditions as the emulated critical path. The maximum propagation delay of an emulated critical path will closely track the propagation delay of the actual critical path of the circuit. The delay of the emulated propagation delay circuit may be easily measured and used to create an output signal that is proportional to the propagation delay in the actual critical path of the circuit.

A critical path may also be simulated by fabricating a circuit with a number of gate delays similar to the number of gate delays in the critical path. Because the simulated propagation delay circuit contains similar gate delays, even though the gates in the actual critical path are not the same, the overall propagation delay may closely match the simulated propagation delay. The actual critical path of the circuit is exposed to the same conditions as the simulated critical path, and the simulated propagation delay will closely track the propagation delay of the critical path of the circuit. The delay of the simulated propagation delay circuit may be measured and used to create a timing signal that is proportional to the propagation delay in the critical path of the circuit.

Figure 7:
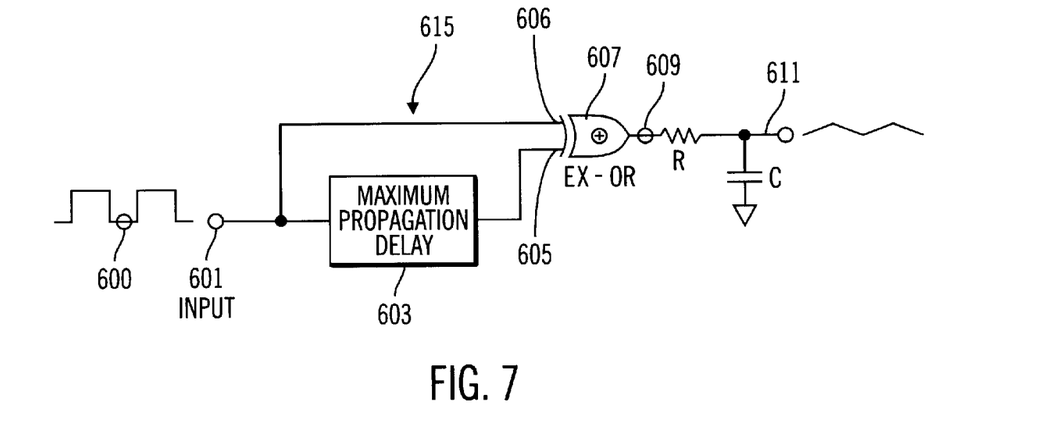
FIG. 7 is a circuit diagram of a propagation delay measurement mechanism.
Figure 8:
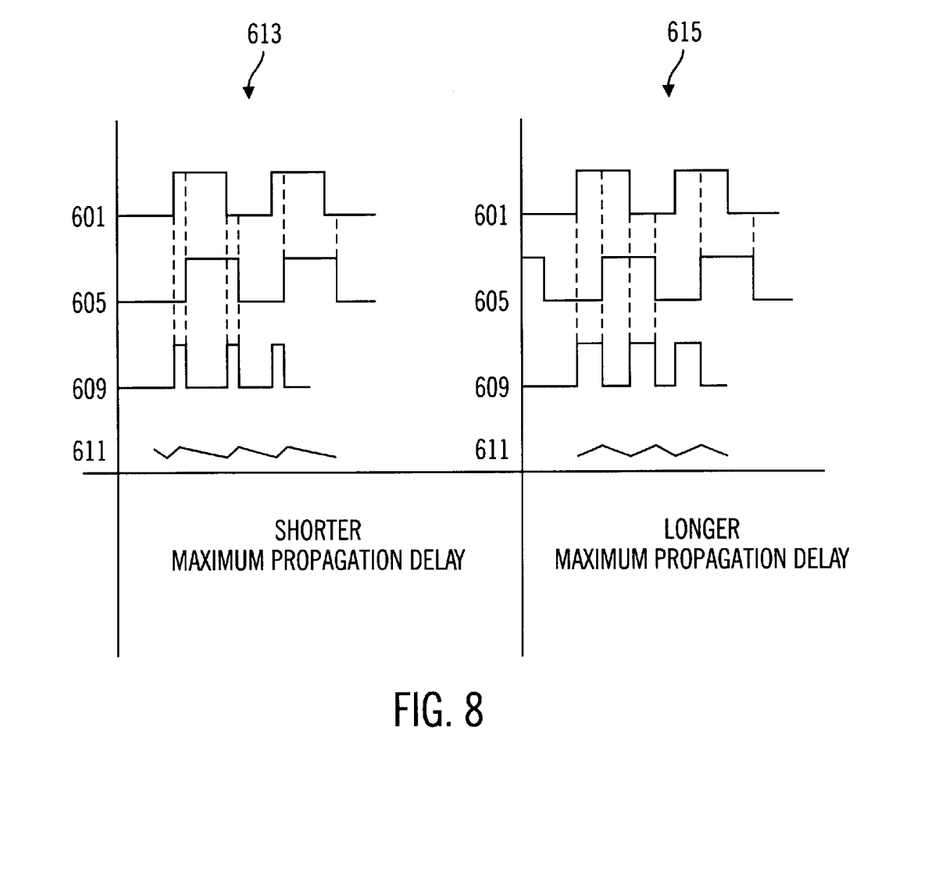
FIG. 8 is a series of graphs illustrating signal waveforms during the operation of the circuit of FIG. 7.

FIG. 7 is a circuit diagram of circuit delay measurement mechanism that may be used to measure propagation delay. FIG. 8 shows a series of graphs illustrating the operation of the delay measurement circuit. FIG. 7 illustrates an embodiment of a circuit that may be used to measure critical path delay by the measurement of the maximum propagation delay 603. The maximum propagation delay 603 may be an emulated critical path, a simulated critical path or the actual critical path. An emulated critical path would comprise a virtual copy of the critical path of the circuit. By duplicating the gates in the critical path, and hence the actual circuit delays in the critical path, an accurate measurement of the delay in the critical path may be made.

A simulated maximum propagation delay 603 may provide a delay that would be an approximate measurement of the gate delays in the critical path. Such a simulation could be fabricated by creating a circuit with the same number of gate delays as the actual critical path circuit. The simulated maximum propagation delay 603 could also be obtained by a variety of other methods, such as measuring the critical path delay and matching it to a delay circuit, by trimming a delay resistor, selecting delay paths, or the like. The actual critical path could also be used. If the actual critical path were used, the path might be measured when the path were not in use by circuitry. That is, a test signal could be applied when the path were not in use. The critical path could also be measured when signals passed through the path in the course of normal operation. In the case where the critical path was measured when signals passed through in the course of normal operation, no stimulus circuitry would be needed. Instead, there would need to be circuitry to time the signal traversing the critical path.

FIG. 7 shows how a stimulus signal might be applied to measure the maximum propagation delay 605 (whether emulated, simulated, or actual) of the critical path. A square wave 600 is coupled into the input 601 of circuit 615 and then becomes input 606 of the EXCLUSIVE-OR gate 607. The square wave 600 may be coupled into the maximum propagation delay circuit 603. The square wave 600 may be delayed by the maximum propagation delay circuit 603. The delayed square wave emerges from the maximum propagation delay circuit 603 and is coupled to input 605 of a comparator circuit, such as the EXCLUSIVE-OR gate 607.

The timing of the input square wave 600 that is coupled to the input 606 of the EXCLUSIVE-OR gate 607, and the output of the maximum propagation delay circuit 603 that is coupled to input 605 of the EXCLUSIVE-OR gate 607, is shown in graphs 613 and 615. Graph 613 illustrates a maximum propagation delay, that is shorter than the maximum propagation delay, depicted in graph 615. This difference in timing is reflected by waveform 609 representing the output of the EXCLUSIVE-OR gate 607. The length of the pulse at 609 is equal to the delay time of a signal propagating through the maximum propagation delay circuit 603.

Graph 613 depicts a shorter delay time of the maximum propagation delay circuit 603 than graph 615. That is, maximum propagation delay in 615 is greater than the maximum propagation delay in 613. This is indicated by the resultant output waveform 609 of the EXCLUSIVE-OR gate 607 and has a shorter duty cycle in graph 613 than it does in graph 615. The output of the EXCLUSIVE-OR gate 607 is coupled into a low pass RC filter. The output 611 of the RC filter is a DC signal level. The DC signal level is higher in the case where the maximum Propagation Delay is longer in graph 615, and shorter where the maximum propagation delay is longer in graph 613. The DC level of the output 611 is directly proportional to the delay time of the maximum propagation delay circuit 603.

Figure 9:
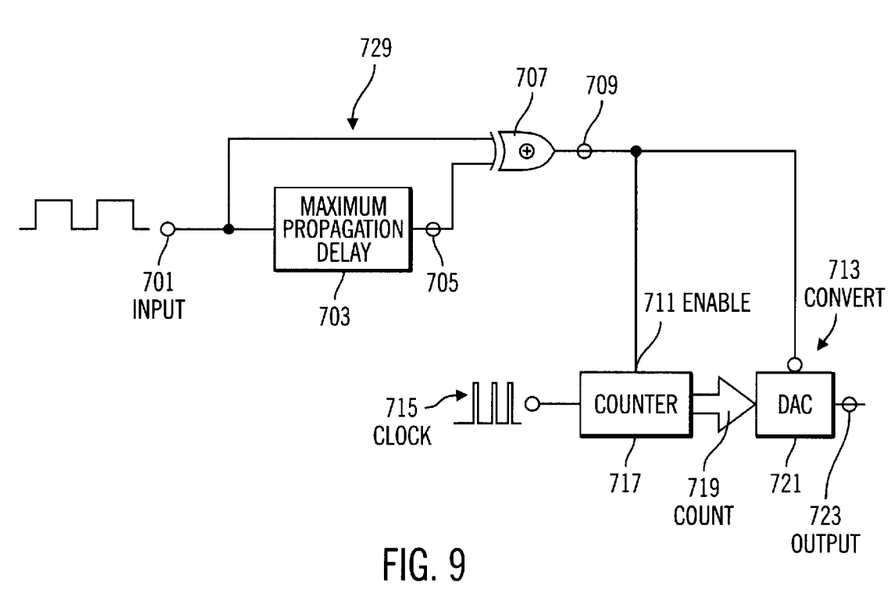
FIG. 9 is a circuit diagram of a circuit delay measurement mechanism.
Figure 10:
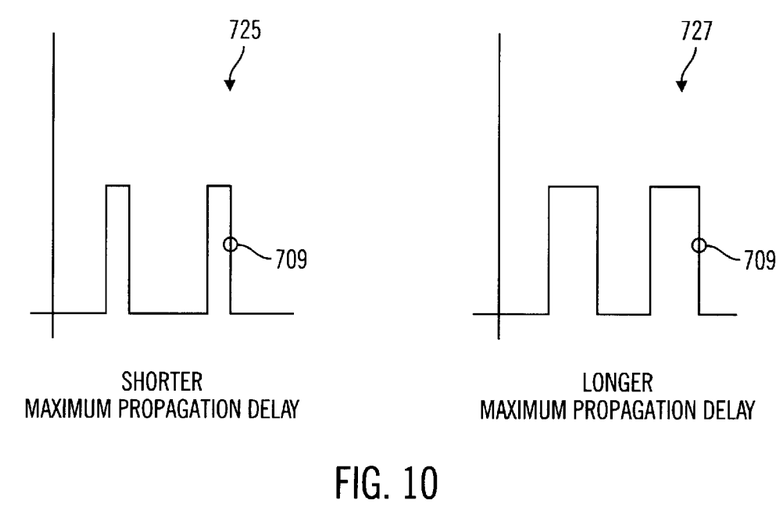
FIG. 10 is a series of graphs illustrating signal waveforms during the operation of the circuit of FIG. 9.

FIG. 9 is a circuit diagram of an illustrative circuit delay measurement circuit 729 that may be used to measure propagation delay. FIG. 10 depicts two graphs illustrating the operation of the delay measurement circuit 729. The delay measurement circuit 729 of FIG. 9 measures critical path delay by measuring a maximum propagation delay 705, that is equivalent to the delay in the critical path. The maximum propagation delay circuit 703 may be a simulated, emulated or an actual critical path of the circuit being measured.

A waveform, such as a square wave, is introduced into input 701. The maximum propagation delay circuit 703 then delays the input waveform by an amount equal to the propagation delay in the critical path of the circuit that is to be measured. The input waveform is then compared, by EXCLUSIVE OR GATE 707, to the delayed input waveform. For the delay period the input and delayed waveforms are different and the EXCLUSIVE OR gate 707 outputs a pulse at 709. The pulse time at 709 is proportional to the maximum propagation delay. Different maximum propagation delays 703 are illustrated in graphs 725 and 727. Graph 725 illustrates waveform 709, when the maximum propagation delay 703 is shorter. Graph 727 illustrates waveform 709, when the maximum propagation delay 703 is longer. In the case where the propagation delay is longer, the duty cycle of the pulse output at 709 is longer, and in the case where the propagation delay is shorter, the duty cycle of the pulse output at 709 is shorter. The output 709 is used as an enable 711 for a counter 717. When the counter 717 is enabled, it may count cycles of the high speed clock 719. The longer the counter is enabled, the higher the count. The count 719 is a digital value directly proportional to the maximum propagation delay 703. The count 719 may be read directly by a variety of digital circuits, such as a controller, including, but not limited to a microcontroller, state machine, digital signal processor or other digital circuits known in the art, to control a power supply voltage. The count 719 may also be converted into an analog voltage as shown in FIG. 8a, where the analog voltage is used to control a power supply voltage. When the counter 717 is disabled, the digital to analog converter 721 is enabled, and may accept the count 719 from the counter 717. When enabled, the digital to analog converter 721 produces an analog output 723, that is proportional to the count 715. The analog output 723 of the DAC 721 is directly proportional to the delay introduced by the maximum propagation delay 703. The maximum propagation delay 703 tracks the propagation delay of the critical path of the circuit and therefore the analog output 723 is directly proportional to the propagation delay in the critical path of the circuit.

The circuit 729 and the circuit 615 both produce DC levels that are directly proportional to the propagation delay in the critical path of the circuit. The DC levels produced by the Circuit 729 and Circuit 615 may be used to control the voltage level of the power supply, that provides power to the circuit. If the DC level is high, meaning the propagation delay in the critical circuit is high, the power supply will be increased. By increasing the power supply the speed of propagation of the signals through the circuit may be increased. If the DC level is low, meaning the propagation delay in the critical circuit is low, the power supply may be decreased. By decreasing the power supply the speed of propagation of the signals through the circuit may be decreased, and the power dissipation of the circuit lowered.

Figure 11:
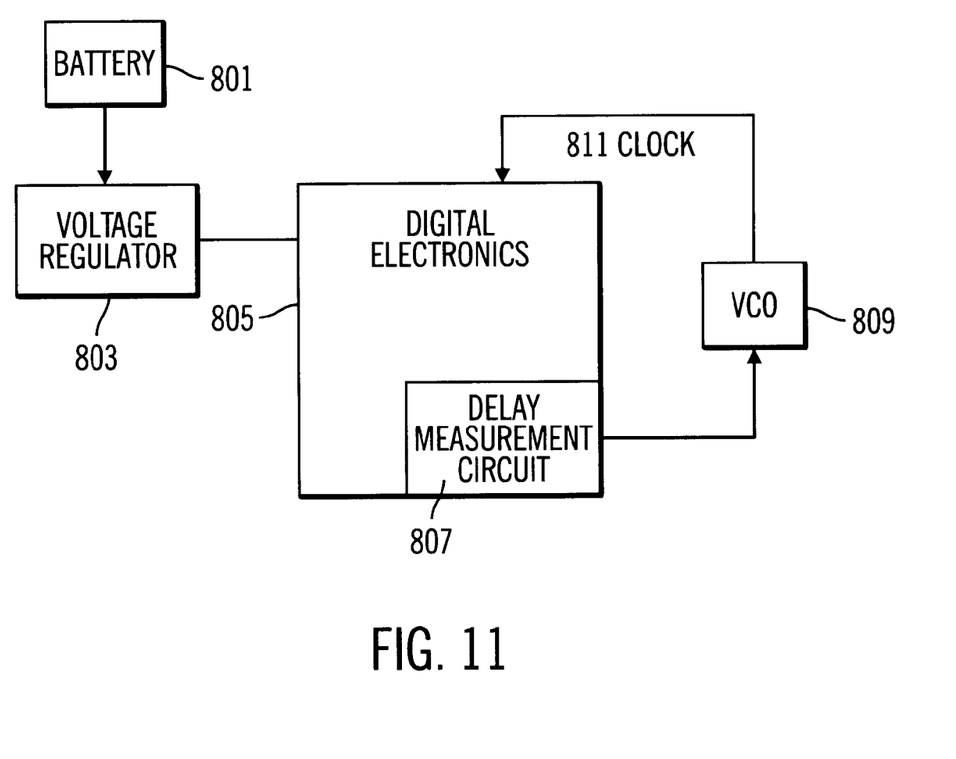
FIG. 11 is a block diagram illustration of a digital circuit in which the clock is controlled by a circuit delay measurement mechanism.

FIG. 11 is a block diagram illustration where the clock frequency of a digital circuit is controlled by a circuit containing a delay measurement mechanism. The delay measurement circuit 807 may be, for example, measurement circuits as disclosed in FIGS. 6a and 7a and accompanying discussions, or may be other suitable equivalent circuits. An object of an embodiment is to power the digital electronics 805 with a combination of low a voltage and/or a low clock frequency. A low voltage may be generated by coupling a battery 801 to a voltage regulator 803 and then providing the output of the voltage regulator 803, to power digital electronics 805. A low clock frequency may be similarly derived by using a delay measurement circuit to control a variable frequency clock, such as a voltage controlled oscillator (VCO) 809, The VCO may then provide a clock 811, the frequency of which is dependent on the propagation delay of the digital electronics 805. By powering the digital electronics 805, with a combination low voltage and low clock frequency, the dissipation of the digital electronics 805 may be reduced. A variety of factors, such as temperature, device fabrication variables etc., may change the propagation delay of the digital electronics 805, so the maximum propagation delay may be the same even in identical integrated circuits. In this manner, the voltage regulator 803 of the circuit may reduced the voltage of the digital electronics 805 to a low value and the circuit clock may be slowed to compensate for the lower voltage. By changing the voltage of the circuit in combination with changing clock frequency of the circuit, various power saving limits may be set for various operating modes of the circuits. Such a mechanism may be employed to reduce power consumption of the digital electronics 805 to a minimum, for example, when employed in a cellular phone and the cellular phone is in the standby mode.

Figure 12:
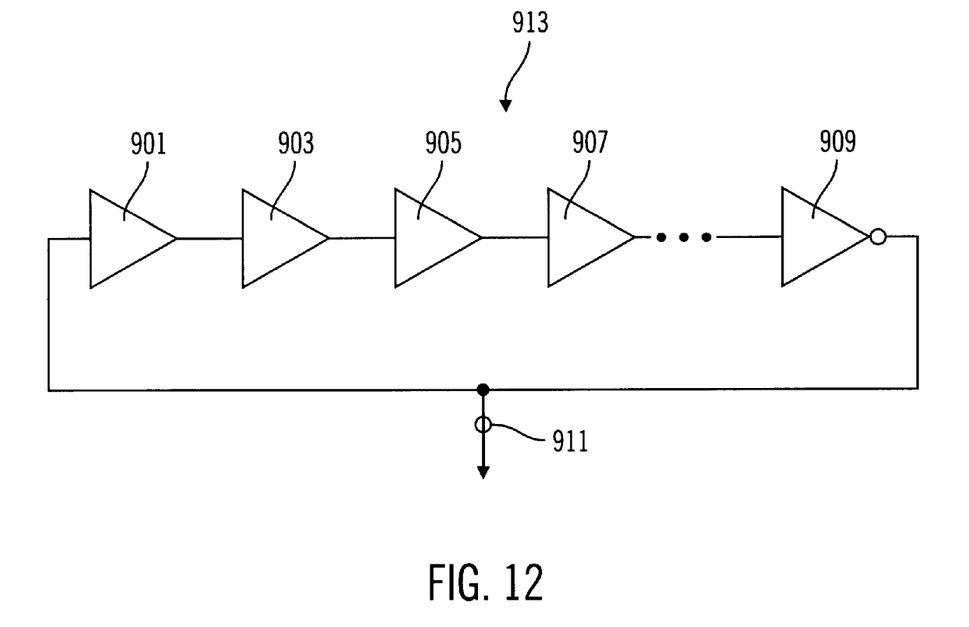
FIG. 12 is an block diagram illustrating a delay measurement circuit that may be used with either variable power supply voltage or variable clock frequency.

FIG. 12 is a circuit diagram that illustrates an exemplary delay measurement circuit 913, that may be used with either variable power supply voltage or variable clock frequency embodiments of the invention. The circuit 913, having the buffers 901, 903, 905, 907 and inverter 909 connected in a series connection comprise a common ring oscillator. The circuit 913 may comprise a simulated critical path delay. Buffers may be added as needed, represented by the dots between buffer 907 and inverter 909 to make the delay of the ring oscillator equivalent to the critical path delay of the digital circuit, in which it is embedded. The output of the ring oscillator 911 may then be used as representative of the maximum propagation delay, and may be inserted in block 703 of FIG. 6 or block 603 of FIG. 7. The output frequency of the ring oscillator may also be used to generate a clock signal, replacing the delay measurement circuit 807 and VCO of 809 of FIG. 11.

Figure 13:
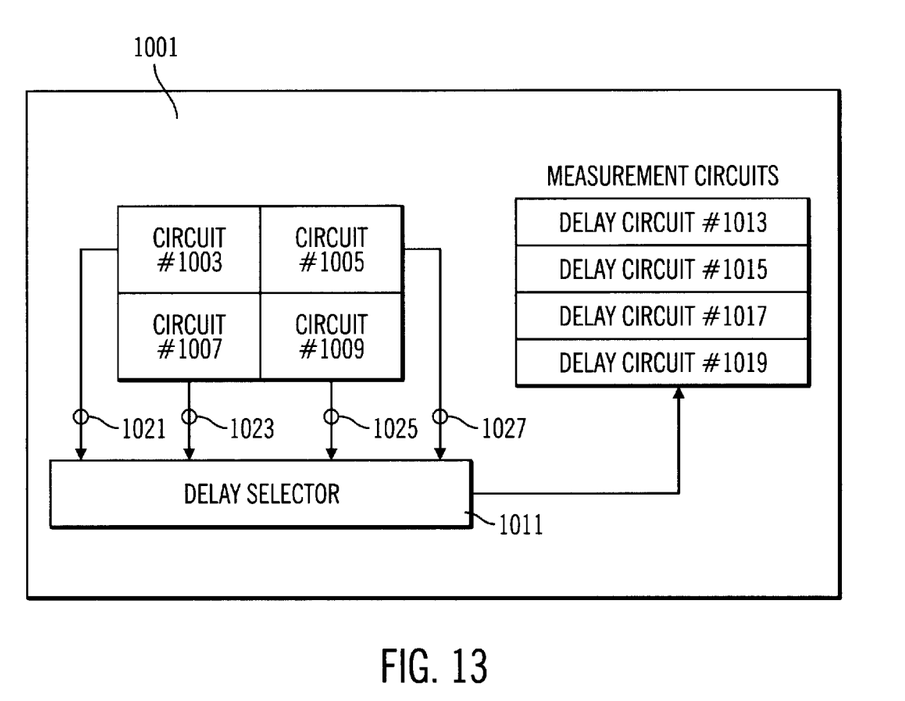
FIG. 13 is block diagram illustrating a digital electronic circuit with subcircuits and delay paths.

FIG. 13 is a further embodiment of the invention. In the embodiment of FIG. 13, the digital electronics circuit 1001 is divided into several subcircuits that may act semi-independently. These subcircuits may represent such functions as, for example, signal encoding, signal decoding, broadcast, and receive sections of a cellular phone. Such subcircuits may be active at different times. Each subcircuit may have a different critical path that is different than the other subcircuit's critical path. By tailoring the circuit to the worst case delay of the active subcircuits, the performance may be improved over the case where the worst case of the entire circuit were used to determine the critical path delay.

The circuit 1001, represents a digital electronic circuit, that may be divided into functional subcircuits. The digital electronic circuit 1001 is further sub-divided into circuit #1003, circuit #1005, circuit #1007 and circuit #1009. Each circuit may be a separate function of the overall circuit, that may or may not be active at any given time. As an illustrative example of such circuits, reference is made to the wireless device example of FIG. 1.

A wireless device may be in several states. For example, it may be in standby mode monitoring for incoming calls, or may be broadcasting to a receiver or receiving a signal from a broadcast unit. The wireless device may be encoding speech for broadcast, or decoding speech to present to a listener. Each circuit may be active at some times and inactive at other times. In the exemplary embodiment, each circuit, represented by circuits #1003 through circuit #1009, may be active at certain times and inactive at others. Each circuit, represented by circuits #1003 through circuit #1009, presents its status (active or not) to a delay selector 1011 through a status line. Each status line is shown in FIG. 13 as 1021, 1023, 1025 and 1027 for circuits #1003 through circuit #1009, respectively. The delay selector 1011 selects the delay circuit (1013, 1015, 1017, or 1019) that corresponds to the longest delay of all the active circuits. The delay circuit thus selected may then be used, as in previous embodiments, to vary the system clock frequency and the power supply voltage separately or in combination, depending on the particular needs of the circuit implementation into which the embodiment has been designed.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. An apparatus for adjusting a circuit parameter based on a measured propagation delay of a circuit to be controlled, comprising:
   a source providing a test signal;
   a maximum propagation delay subcircuit having a delay corresponding to a delay of a critical path of the circuit to be controlled for accepting the test signal and generating a delayed test signal;
   a comparing subcircuit that accepts the test signal and the delayed test signal and produces a timing signal proportional to the delay detected between the test signal and the delayed test signal; and
   a controller that accepts the timing signal and adjusts the circuit parameter in proportion to the timing signal.

2. The apparatus of claim 1 wherein the circuit parameter controlled is the voltage of a power supply.

3. The apparatus of claim 1 wherein the circuit parameter controlled is a clock rate of the circuit.

4. The apparatus of claim 1, wherein a maximum propagation delay circuit is an emulation of a critical path of the circuit to be controlled.

5. The apparatus of claim 1, wherein the maximum propagation delay subcircuit is a simulation of the critical path of the circuit to be controlled.

6. The apparatus of claim 1, wherein the maximum propagation delay circuit is a critical path of the circuit to be controlled.

7. The apparatus of claim 1 further comprising an additional delay in the maximum propagation delay subcircuit providing an additional timing margin to the maximum propagation delay circuit.

8. A method for adjusting a circuit parameter based on the propagation delay of signals through a circuit to be controlled, comprising:
   providing a maximum propagation delay subcircuit where a delay corresponds to the delay in a critical path of the circuit to be controlled;
   producing a delay signal based on the delay through the maximum propagation delay in the circuit to be controlled;
   developing a control signal based on the delay signal; and
   adjusting a circuit parameter in the circuit to be controlled based on the control signal.

9. The method of claim 8, wherein the step of producing a delay signal based on the delay through the maximum propagation delay subcircuit in the circuit to be controlled, further comprises:
   coupling a test signal into maximum propagation delay subcircuit;
   producing a delayed test signal by delaying the test signal in the maximum propagation delay subcircuit; and
   comparing timing of the test signal to the delayed test signal.

10. The method of claim 8 wherein the step of using the control signal to adjust a circuit parameter in the circuit to be controlled comprises adjusting the power supply voltage of the circuit to be controlled based on the value of the control signal.

11. The method of claim 8 wherein the step of using the control signal to adjust a circuit parameter comprises adjusting the clock frequency of the circuit to be controlled based on the value of the control signal.

12. A method for adjusting a circuit parameter based on a propagation delay of signals through a circuit to be controlled, comprising:
   separating the circuit to be controlled into subcircuits to be controlled, the subcircuits each having different critical paths;
   measuring maximum propagation delays in the subcircuits to be controlled; determining which subcircuits are active;
   selecting the longest measured maximum propagation delay of the active subcircuits;
   developing a control signal based on the longest measured maximum propagation delay of the active subcircuits to be controlled; and
   adjusting a circuit parameter based on the control signal.

13. The method of claim 12 wherein the step of adjusting a circuit parameter further comprises adjusting the power supply voltage of the subcircuit controlled based on the value of the control signal.

14. The method of claim 12 wherein the step of adjusting a circuit parameter further comprises adjusting the clock frequency of the subcircuit controlled based on the values of the control signal.

15. An apparatus for adjusting a circuit parameter means based on a measured propagation delay of a circuit to be controlled, comprising:

a source means providing a means for a test signal;

a maximum propagation delay subcircuit means having a delay corresponding to a delay of a critical path of the circuit to be controlled for accepting the means for the test signal and generating a means for a delayed test signal;

a comprising subcircuit means that accepts the means for the test signal and the means for the delayed test signal and produces a timing signal means proportional to the delay detected between the means for the test signal and the means for the delayed test signal; and a controller means that accepts the means for the timing signal and adjusts the circuit parameter means in proportion to the means for the timing signal.

16. A method for adjusting a circuit parameter means based on a means for a propagation delay of signals through a circuit means to be controlled, comprising:

providing a means for a maximum propagation delay subcircuit where a delay means corresponds to the delay means in a critical path of the circuit means to be controlled;

producing a means for delay signal based on the delay means through the means for the maximum propagation delay in the circuit to be controlled;

developing a means for a control signal based on the means for the delay signal; and adjusting a circuit parameter means in a circuit means to be controlled based on the means for the control signal.

17. The method of claim 16, wherein the step of producing the means for the delay signal based on the delay means through the maximum propagation delay subcircuit in the circuit to be controlled, further comprises:

coupling a means for a test signal into the maximum propagation delay subcircuit; producing a delayed test signal means by delaying the test signal in the maximum propagation delay subcircuit; and comparing timing of the test signal to the delayed test signal means.

18. A method for adjusting a circuit parameter means based on a means for a propagation delay of signals through a circuit to be controlled, comprising:

separating the circuit to be controlled into means for subcircuits to be controlled, the means for the subcircuits each having different means for critical paths;

measuring maximum propagation delays means in the means for subcircuits to be controlled;

determining which means for subcircuits are active;

selecting the longest measured maximum propagation delay means of the active means for subcircuits;

developing a control signal means based on the longest measured maximum propagation delay means of the active means for subcircuits to be controlled; and adjusting the circuit parameter means based on the control signal means.

\* \* \* \* \*